United States Patent [19]

Bortolotti et al.

[11] 4,392,802
[45] Jul. 12, 1983

[54] APPARATUS FOR BLOW MOLDING AND CONDITIONING SYNTHETIC RESIN CONTAINERS

[75] Inventors: Andrea Bortolotti; Mauro Bettucchi, both of Bologna, Italy

[73] Assignee: Automa S.p.A., Bologna, Italy

[21] Appl. No.: 316,776

[22] Filed: Oct. 30, 1981

[30] Foreign Application Priority Data

Nov. 14, 1980 [IT] Italy ................................ 3569 A/80
Oct. 16, 1981 [IT] Italy ................................ 3551 A/81

[51] Int. Cl.³ .......................................... B29C 17/07
[52] U.S. Cl. .................................... 425/107; 425/531; 425/532; 425/534; 425/541
[58] Field of Search ............... 425/532, 534, 541, 531, 425/107; 264/542

[56] References Cited

U.S. PATENT DOCUMENTS

| | | | |
|---|---|---|---|
| 3,964,852 | 6/1976 | Marfiewicz | 425/541 |
| 3,972,669 | 8/1976 | Mehnert | 425/532 X |
| 4,248,582 | 2/1981 | Martin, Jr. | 425/532 X |
| 4,260,358 | 4/1981 | Mehnert | 425/541 X |
| 4,304,543 | 12/1981 | Rolniczak et al. | 425/532 |

FOREIGN PATENT DOCUMENTS 2310951 9/1974 Fed. Rep. of Germany ...... 425/532

Primary Examiner—Jan H. Silbaugh

[57] ABSTRACT

An improved apparatus for blow molding and conditioning synthetic resin containers, comprising 2 end walls, to which the permanent molds that jointly constitute one (1) forming mold are locked in a removable fashion, these being movable synchronously between 2 stations, namely an extrusion and a blowing station, powered concurrently in opposite directions by the operating devices with which the apparatus is equipped. Into the forming mold, at the extrusion station, is extruded a tubular element of synthetic resin having notable plastic deformation characteristics which, as a result of compressed air being blown therein, is formed into a corresponding synthetic resin container. To each end wall is locked a bush that is coupled to a tubular shaft in a way whereby longitudinal translation but not rotation be possible, and the latter is united, in a position equidistant from the bushes, to a coupling sleeve that is fixed to a saddle, underneath the shaft, and slides on guides having a downward inclination from the extrusion to the blowing station. The tubular shaft contains part of the devices for operating the end walls or is an integral part thereof.

9 Claims, 6 Drawing Figures

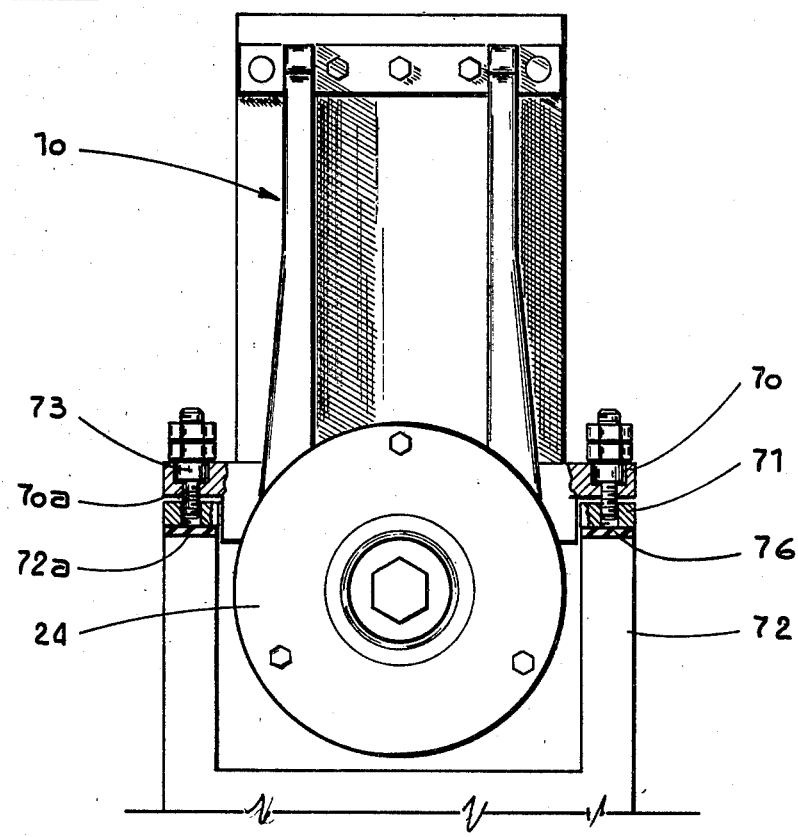
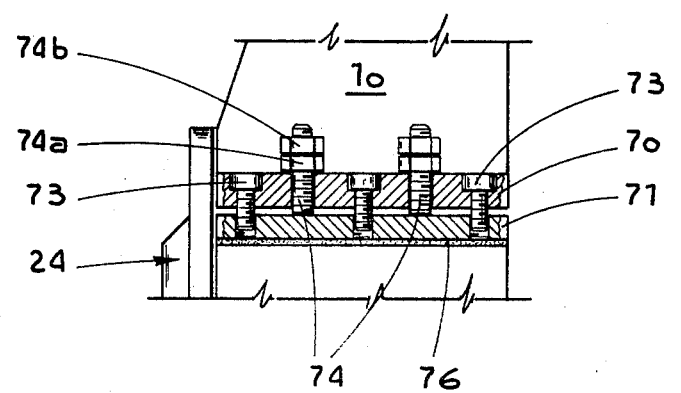

APPARATUS FOR BLOW MOLDING AND CONDITIONING SYNTHETIC RESIN CONTAINERS

BACKGROUND OF THE INVENTION

The invention relates to an improved apparatus for blow molding and conditioning synthetic resin containers.

DESCRIPTION OF THE PRIOR ART

Known apparatuses of the above mentioned type comprise an extruder (the extrusion head of which is of universal type so as to extrude what are called conventional synthetic resins, namely polyethylene and ABS etcetera, as well as heat sensitive resins, such as polyvinyl chloride and polycarbonate etcetera) fed continuously by an endless screw conveyor which, in turn, is supplied by a hopper containing the synthetic resin in granular form.

As is known, a tubular element (referred to by technicians in the industry concerned as a "parison") is formed at the outlet from the extrusion head (in other words, at the extrusion station) and the bottom part of this remains trapped in between the two permanent molds (that constitute the forming mold) movable synchronously in opposite directions at the time of their closure.

The said permanent molds define a vacuum mold with an impression corresponding to the external profile of a given container, this communicating at the top with the outside via a cylindrical channel that constitutes the upper end part (or mouthpiece) of the said container.

The permanent molds are supported by end walls carried by rods that terminate at a saddle movable along inclined guides (the elevation of which decreases, starting from the extrusion station) perpendicularly to the direction along which the said permanent molds are displaced with respect to one another.

The said saddle travels between the extrusion station and a blowing station. During the translation from the former to the latter, the part of the said tubular element close to the mouth of the mold intercepts cutting means, the shape of which is such as to shear the said tubular element so that the part thereof trapped in the mold be accessible from the outside (in other words, not closed by the said shearing operation) and that it protrudes slightly out of the mouth of the mold.

What takes place first of all at the blowing station is that a nozzle (connected to a source of compressed air) is inserted hermetically into the mouth of the said vacuum forming mold, and then pressurized air is sent into the said tubular part held under restraint inside the mold; as a consequence of this a container is formed.

With the parting of the two permanent molds (and the resultant opening of the forming mold) the said container does not drop out since the mouthpiece thereof is tightly enshrouded around the lower extremity of the nozzle.

Concurrently with the subsequent positioning of the saddle at the extrusion station and the consequent closure of the mold (with the restraint therein of a further part of the said tubular element), gripping means (integral with the end walls) are positioned at two sides of the container hanging to the nozzle and are hooked onto the said container. When the saddle moves anew towards the blowing station, the aforementioned gripping means cause the mouth of the container to be withdrawn from the nozzle and, in time with the positioning of the saddle at the blowing station and with the opening of the mold subsequent to the operation of the nozzle, deposit the container on a suitable conveyor, after which the action of grasping the said container on the part of the said gripping means ceases.

The apparatuses as outlined above are, furthermore, provided with devices for "shaving" the container made in the way described.

In known apparatuses, the said end walls are generally supported, and guided at the same time, by corresponding pairs of rods cantilevered onto the said saddle, and they are driven synchronously, in opposite directions, by mechanical or oil hydraulic means of a known type.

The static and dynamic stress that the said end walls pass onto the corresponding rods thereof, as a consequence of the weight of the end walls and of the corresponding permanent molds thereof, as well as of the support pressure occasioned by the necessity to keep the said end walls pressed tightly in order to overcome the force (in the order of a few hundred kilograms) caused by the pressurized air sent inside the forming mold, is amplified by the considerable torque arms that exist between the line of action of the said stress and the said saddle.

The consequential momenta related to the said stress adversely affects the dimensioning of the support structure (end walls, bars, saddle etcetera), the elastic deformation amplitude induced by the said stress and, with the passing of time, the reliability of the compactness of the said structure; this last point being particularly negative since it introduces annoying vibration (with the possibility of some of the mechanical parts breaking through fatigue, and it does not guarantee the mouth of the forming mold being positioned, as required, at the above mentioned stations, this involving all the obvious problems related thereto.

Various contrivances are known for limiting the extent or the effects of dynamic stress, though with all, constructional complications are considerable and the overall volume of the apparatus is adversely affected.

One such a contrivance envisages means that couple one to the other having articulated on both the end walls, the coupling being effected one moment prior to the insertion of compressed air into the forming mold and ceasing with the end of this operation. The particular complexity of such a contrivance is obvious.

Another such a contrivance envisages there being two blocks, each fixed to the support structure of a corresponding end wall and, with respect to the rods for supporting and guiding the end wall, positioned on the opposite side thereto. The said blocks are destined to come flush together concurrently with the closing of the forming mold. Here again there are obvious constructional complications caused by the need for the closing of the forming mold to be contemporaneous with the abutting of the said blocks.

Other stress that originates in known apparatuses is consequentially to the force that the nozzle inserted in the mouth of the vacuum forming mold exerts, for sealing reasons, on the upper edge of the said mouth. The bending moment caused by the said stress is, because of the considerable amplification stimulated by the torque arm between the line of action of the said stress and the aforementioned supporting saddle, not such that it can be disregarded.

SUMMARY OF THE INVENTION

The object of the invention is to make available an improved apparatus for blow molding and conditioning synthetic resin containers, in which the structure for supporting the end walls that carry the permanent molds defining the forming mold, and the means for operating, in opposite directions, the said end walls, are shaped and correlated in such a way as to create an extremely compact, functional and resistant group of long duration, wherein the static stress causes, in practice, compression stress on the group carrying saddle, while the dynamic stress brings about the creation of bending and twisting moments in the structure elements that support the end walls and the saddle, the entity of which is far less compared to the stress applied to the known apparatuses in which there is a similar amount of stress on the said end walls, generated by the pressurized air.

Another object of the invention is to make available an apparatus which, besides satisfying the preceding object, is achieved with elements that can easily be assembled and dismantled and wherein maintenance is limited.

The foregoing is attained with the improved apparatus for blow molding and conditioning synthetic resin containers according to the invention, of the type that comprises: at least one extruder, fed with granules of a predetermined synthetic resin, from the extrusion head of which, that points downwards and defines an extrusion station, issues in an unbroken fashion a tubular element made of the said synthetic resin; two end walls, able to slide supported and guided by first support means, to which are locked in a removable fashion and in opposite positions, corresponding permanent molds which, when in the closed position, jointly define a vacuum formation mold whose upper part is provided with a mouth that communicates with the outside and whose inside part outlines the profile of a corresponding container; means for operating the said end walls, the actuation and deactuation of which constitute, for the aforementioned permanent molds, the said position of closure and an open position, respectively; means for synchronizing, in opposite directions, the translation of the said end walls; a saddle that carries the aforementioned support means and slides on rectilineal guides perpendicular to the translation direction of the said end walls, the inclination of the said guides being such as to decrease the elevation of the said end walls, starting from the said extrusion station; means for driving the said saddle between the said extrusion station and a blow molding station; means for shearing the said tubular element, the lower part of which is stably held under restraint in the vacuum forming mold at the time the said permanent molds are in the position of closure, in consequence of the translation of the said end walls from the extrusion station to the blow molding station; at least one nozzle, connected to a source of compressed air, movable vertically, positioned at the said blow molding station and destined to be hermetically inserted into the mouth of the said vacuum forming mold; gripping means, integral with the said end walls, destined to hook onto the container hanging on the said nozzle, to release the said container from the said nozzle, and to deposit the said container on a suitable conveyor; means for controlling the said operating means, destined to actuate and deactuate them compatibly with the positioning of the said end walls at the extrusion station and at the blow molding station, respectively, in the latter case at a time subsequent to the insertion of compressed air into the said vacuum forming mold; the said apparatus being characterized by the fact that the said first fixing means comprise: a tubular shaft that at least partially houses in the inside thereof, the aforementioned operating means, and is connected externally in the center to coupling means integral with and positioned above the said saddle; at least two bushes coupled to the said shaft in a way whereby they are able to slide, positioned bilaterally to the said coupling means, each locked to one of the said end walls through the medium of second fixing means; means for locking one to the other, the coupling means and the said shaft, destined to prevent any rotation of the latter with respect to the axis thereof; and means for coupling one to the other in a sliding fashion and in the direction parallel to the axis of the said shaft, each end wall and the said saddle, destined to prevent any rotation of the said end wall with respect to the axis of the said shaft.

BRIEF DESCRIPTION OF THE DRAWINGS

Emphasis is given in the text that follows to the characteristics of the apparatus according to the invention, with reference to the accompanying drawings, in which:

FIGS. 5 and 6 are views of a constructional variant for the items Z in FIG. 3, seen from the side in the former and from the front in the latter, part of which in in plan view form and part of which is in sectional form.

DESCRIPTION OF THE PREFERRED EMBODIMENT

Figure 1:
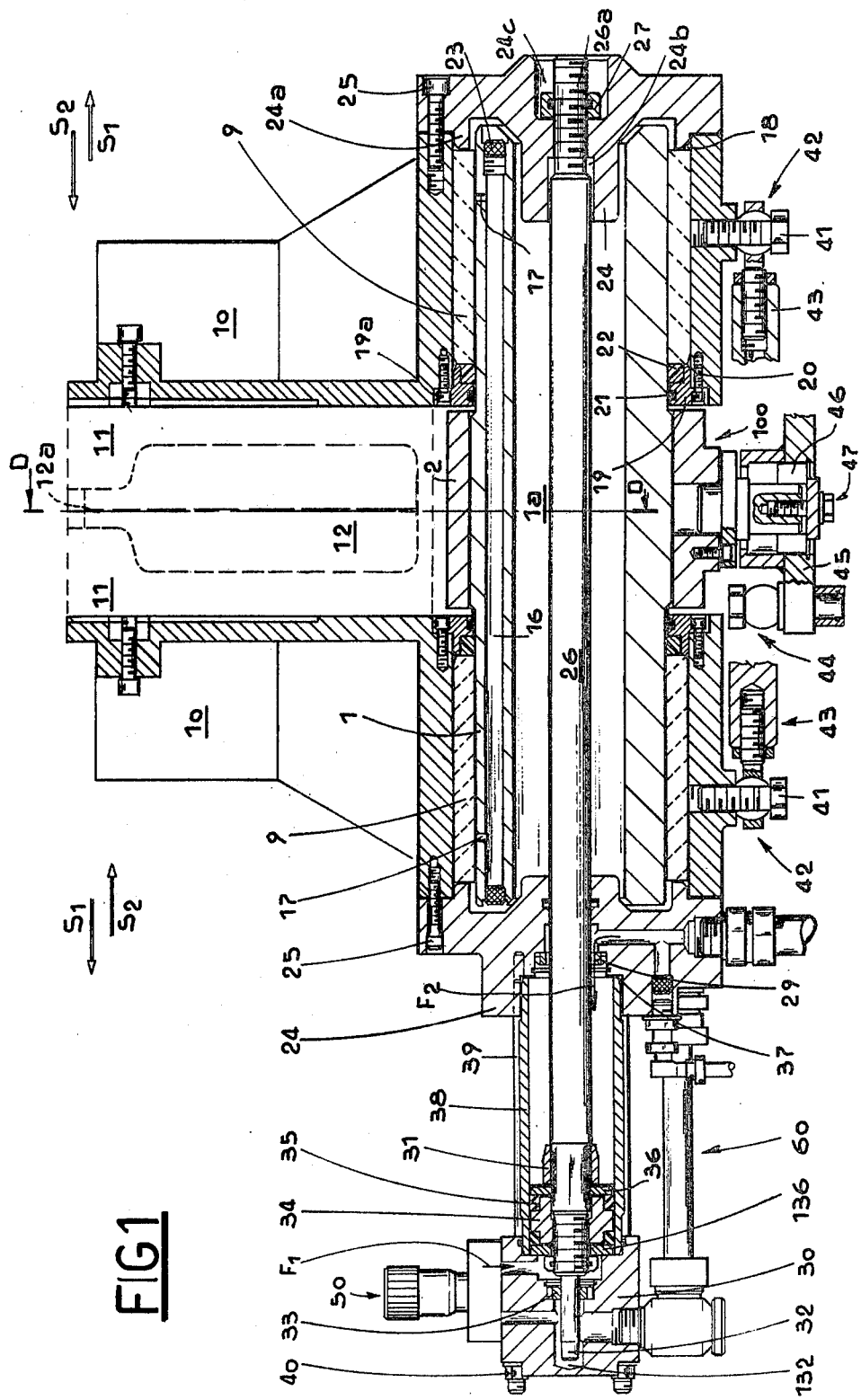
FIG. 1 is an axial longitudinal sectional view of the apparatus in question.

With reference to the above figures, at 1 has been shown a tubular shaft which, in a central position, is tightly enshrouded by a sleeve 2 that can be coupled thereto. The sleeve 2, through fixing means 13 of a known type, is locked in a removable fashion to stanchions 4 supported, in a way in itself known, by a saddle 100.

The saddle 100 slides along an inclined plane 6, the elevation of which decreases towards a station H, starting at a station K. More about the said stations will be said in the ensuing text.

Through support means 5 of a known type, the saddle 100 is connected, with the interposition of a ball and socket joint 7, to a tie rod 8, the latter being directly operated by suitable powering means that are not depicted in the accompanying figures.

Figure 2:
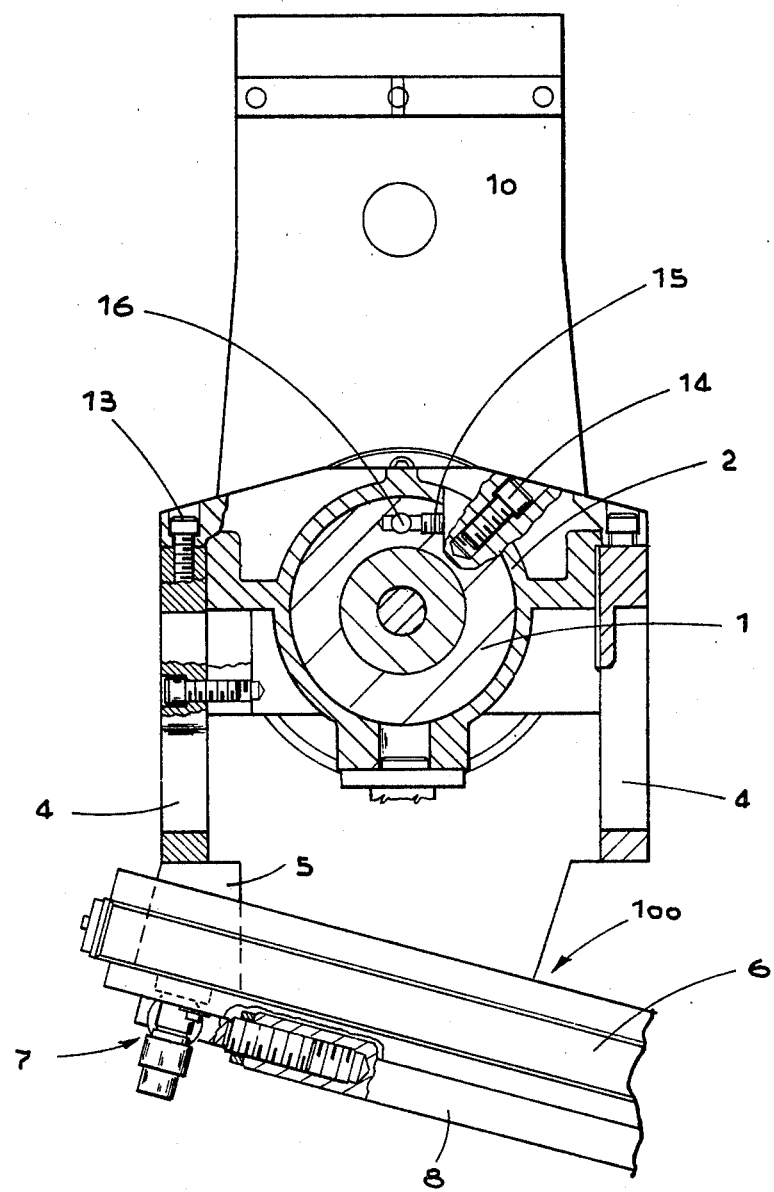
FIG. 2 is a view of the major characterizing elements in the section D—D in FIG. 1.

For the purpose of preventing any rotation of the shaft 1 with respect to the axis thereof, two screws 14 are provided which lock one to the other, the sleeve 2 and the shaft 1; see in this connection FIG. 2.

In addition to a longitudinal through hole 1a, in the shaft 1 there is longitudinally a hole 16, the ends of which are sealed with plugs 23. The hole 16 communicates with the outside via a hole 15 (connected to a suitable source of lubrication that is not illustrated) and via two additional holes 17 whose function will be explained hereinafter.

With reference to FIG. 1, at 10 have been shown two end walls to which are fixed, at opposite positions (through known non-illustrated systems), two permanent molds 11 that define the forming mold. When, in fact, the aforementioned permanent molds 11 are in the closed position they constitute a vacuum forming mold 12 (that communicates with the outside through a mouth 12a), in which is outlined the external profile of a corresponding container.

In the lower part of each end wall 10 there is a through hole 18 whose inside surface tightly enshrouds a corresponding bush 9 coupled externally to the said tubular shaft 1. It thus ensues that the two bushes 9 in respect of the said end walls 10 are positioned bilaterally with regard to the aforementioned coupling sleeve 2.

The extremity turned towards the said sleeve 2 of the hole 18 in each end wall 10 is shaped in such a way that, freely coupled thereto, it is able to accept a flange 19 secured to the relevant end wall by means of the screws 19a. Each flange 19 is profiled to constitute an abutment shoulder for the extremity of the corresponding bush 9 and, furthermore, the conformation thereof is such as to house an oil scraper 21 and to contain, jointly with the relevant bush 9, a seal 22.

To each end wall 10, on the opposite side with respect to the flange 19, is fixed by the screws 25, a head 24 coaxial with respect to the shaft 1. On the said head 24 there is a projecting part 24a destined to come flush up against the corresponding extremity of the relevant bush 9. In this way, the latter is held under restraint between the flange 19 on one side, and the head 24 on the other.

In the center of each of the said heads 24, placed longitudinally, there is a through hole 24b destined to accept, freely coupled therein, a rod 26 belonging to a piston 34 that slides inside a cylinder 38.

One extremity 26a of the rod 26 (namely the one turned towards the end wall 10 positioned on the right in FIG. 1) is so threaded as to screw engage with a self-locking nut 27 which fits flush up against the base surface of a cylindrical seat 24c with which the corresponding head 24 is provided. In this way, the connection between the rod 26 and the head 24 is achieved, as is also that between the rod 26 and the end wall 10 on the right (again with reference to FIG. 1).

The seat 24c in the other head 24 receives, recessed therein, one extremity of the said cylinder 38, the other extremity directly abutting with a block 30 against which exert an effect the nuts 40 screwed onto one threaded extremity of corresponding tie rods 39 (of which there are four) whose other extremity, also threaded, screw engages with the corresponding head 24. In this way, the connection is effected of the block 30 and the cylinder 38 to the head 24 (on the left in FIG. 1).

The block 30 is provided with a seat 132 in which is freely housed a spigot 32 coaxially fixed to the piston 34 (on the opposite side with respect to the rod 26). The said spigot 32 is tightly enshrouded by a braking gasket 33 housed in a suitable seat machined in the said block 30.

Furthermore, for the piston 34-rod 26 group provision has been made for an additional braking gasket 29 (housed in a suitable seat machined in the lefthand head 24) for a bush 31 positioned at the immediate side of the extremity of the piston 34 turned towards the stem 26.

Provided between the bush 31 and the piston 34 there is a washer 36 which, together with another washer 136, has the task of retaining in loco the seals 35 in respect of the piston 34.

Shown diagrammatically in FIG. 1 at 50 and 150, respectively, there is a device for regulating the flow of oil to be sent to the inside of the cylinder 38, and the lines for channeling the said oil towards the said cylinder and for discharging it there from. The means and methods employed to send the oil into the said cylinder 38 either in direction $F_1$ or in direction $F_2$ have not been shown in detail since they are part and parcel of the known art.

In FIG. 1, the two end walls 10 have been depicted in the position of minimum distance one from the other, that is to say, the position in which the corresponding permanent molds are closed. It is of fundamental importance for the forming mold 12 to always be positioned identically with respect to the said sleeve 2 (which requires the end walls 10 to move synchronously in opposite directions); furthermore, for perfect congruity between the forming mold 12 and the corresponding container, it is necessary that the end walls 10 be prevented from rotating with respect to the axis of the shaft 1. Both of the aforementioned requirements are achieved through the incorporation of the constructional characteristics described hereinafter.

It is obvious from the foregoing that the insertion of oil under pressure into the cylinder 38 in the direction $F_1$, or in the direction $F_2$, means the end walls 10 having to be displaced in the opposite directions $S_1$ and $S_2$, respectively.

In order to render the said movements synchronous, provision has been made for synchronizing means constituted by two tie rods 43, each of which has one extremity locked (through a ball and socket joint 42 and fixing means 41) to the lower part of the corresponding end wall 10, while the other extremity is connected (through a ball and socket joint 44) to a disk 45 at an equidistant position, and on the same diameter, with respect to the extremity of the other tie rod 43 connected to the same disk 45. With the interposition of a bearing 46 and through a screw 47, the said disk 45 is connected to the aforementioned saddle 100 and this arrangement allows the said disk to rotate with respect to the axis thereof.

Figure 3:
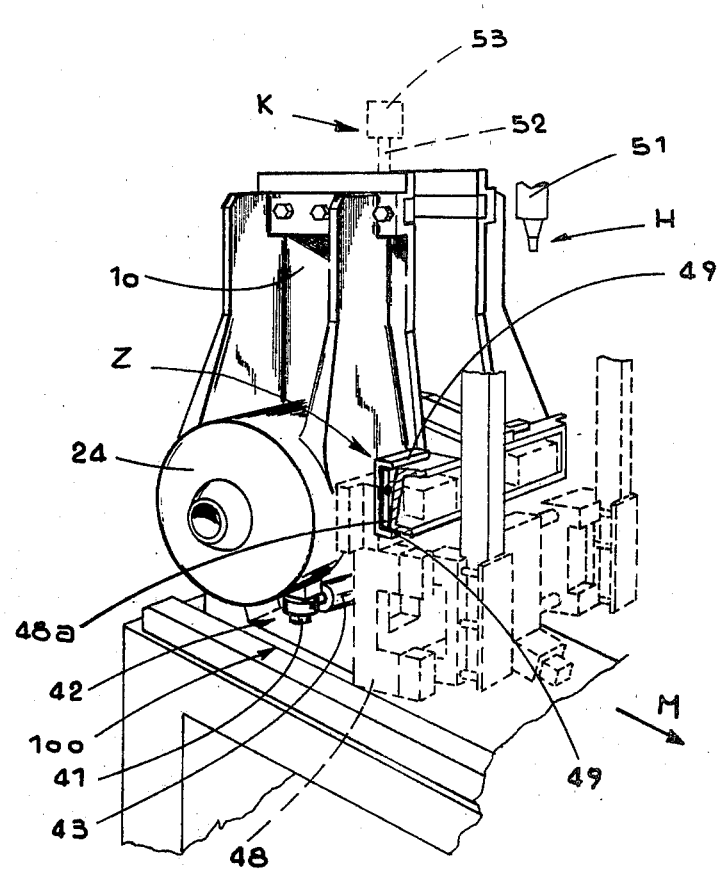
FIG. 3 is a perspective view of the apparatus in question, with certain parts removed so that interesting constructional peculiarities may be stressed.

The presence of the disk 45, together with the associated tie rods 43 thus enables the synchronism, in opposite directions, of the end walls 10 to be achieved. To prevent any rotation of either end wall 10 with respect to the axis of the shaft 1, provision has been made for the items Z which, in a first form of construction (FIG. 3) comprise for each end wall 10, two front fins 49 that are parallel one with the other and, at the same time, are parallel with the axis of the shaft 1. Fixed between the said fins 49 there is a plate 48c, a vertical surface of which mates with a surface provided in a vertical arm 48 integral with the said saddle 100. It thus follows that the said mating prevents any rotation of the end wall 10 with respect to the axis of the shaft 1 and, at the same time, does not impede the translation of the said end walls in the said directions $S_1$ and $S_2$.

In a second form of construction (FIGS. 5 and 6), the items Z comprise for each end wall 10, two longitudinal projecting parts 70 integral with the said end wall and made on opposite sides with respect thereto.

The underneath surfaces 70a of the said projecting parts are positioned above the corresponding upper surfaces 72a of the corresponding upright members 72 integral with the saddle 100. Placed between the two pairs of opposite surfaces 70a and 72a there are pads 71 (one pad per pair) and the strips of self-lubricating material 76 for these, that are integral with the surfaces 72a.

The locking of the pads 71 to the projecting parts 70 is achieved through the use of thread cutting screws 73, while the take up of the inevitable play due to machining tolerances is effected through the screws 74 (along with the corresponding nuts and lock nuts, 74a and 74b, respectively), the lower end of which touches against the corresponding upper surface of the relevant pad 71.

It follows from the foregoing that the mating of the pads 71 and the strips 76 located on the upright members 72 prevents any rotation of the end wall 10 concerned with respect to the axis of the shaft 1 and, at the same time, does not impede the translation of the said end walls in the directions $S_1$ and $S_2$.

With the variant outlined in FIGS. 5 and 6, it is possible to discharge onto the pads 71 and thus onto the upright members 72, part of the static weight applied to each end wall 10, and this has a favorable effect on the wear of the corresponding bushes 9.

The dynamic stress that exercises a direct downward pressure on the end walls 10, consequent to the blow molding operation, more about which will be said below, the value of which is notably greater than that of the static stress, discharges prevalently onto the bushes 9 on account of the elasticity of the strips of self lubricating material 76.

A brief description will now be given of the operation of the apparatus according to the invention.

The said saddle 100 is movable between two extreme positions whereby the end walls 10 (or more precisely, the vertical axis of the mouth 12a of the forming mold 12) are carried into two stations, namely K and H. At the former (or in other words, the extrusion station) there is an extrusion head of universal type (shown diagramatically at 53 since it is part and parcel of the known art), which is destined to form a tubular element 52 (called by the technicians in the industry concerned a "parison") made of synthetic resin able to undergo considerable plastic deformation. At the station H, that is to say, the blow molding station, there is a vertically movable nozzle 51 that is connected to a suitable non-illustrated source of compressed air.

The end walls 10 arrive at the station K at the maximum distance apart envisaged, that is to say, in the position in which the permanent molds 11 thereof are open so as not, in any way, to touch the tubular element 52.

The subsequent approach, one towards the other, of the end walls 10, in the direction $S_2$, carries the permanent molds 11 into the closed position in which the tubular element 52 is held under restraint inside the forming mold and projects there from via the said mouth 12a.

The translation of the end walls 10 from the station K to the station H (direction M) includes the tubular element 52 coming into contact with non-illustrated cutting means of a known type. As a result of the shearing operation that takes place, the part of the element 52 held under restraint in the forming mold 12 protrudes slightly with respect to the mouth 12a, with the external extremity thereof completely open.

Immediately the end walls 10 have been positioned at the station H, the nozzle 51 drops downwards so as to be hermetically coupled to the mouthpiece 12a. This, consequently, involves the lower extremity of the said nozzle being inserted inside the tubular element 52; subsequently, through the nozzle 51, compressed air is sent into the vacuum forming mold 12, or rather into the inside of the tubular element 52 which, on account of the notable plastic deformation characteristics of the material used in the making of the said tubular element, causes it to consequently adopt the form defined by the contour walls of the said forming mold 12.

At a time following the said blow molding operation, sufficient for the container formed in this way to be of adequate rigidity, the translation takes place in the directions $S_1$ of the end walls 10 whereby the permanent molds 11 are carried into the open position. The container, formed in the way outlined above, remains hanging to the nozzle 51 since the lower extremity of this is tightly enshrouded by the neck of the said container.

The means destined to hook onto the thus formed container and to displace it onto a suitable conveyor, have not been illustrated since they are part and parcel of the known art. Likewise no illustration has been given of the means used to clean, as is inevitably necessary, the container in question.

In FIG. 1 have been shown the means for operating the end walls 10 which virtually are the rod 26, the piston 34 and the cylinder 38. A second possible form of embodiment for the said operating means has been illustrated diagrammatically in FIG. 4.

Figure 4:
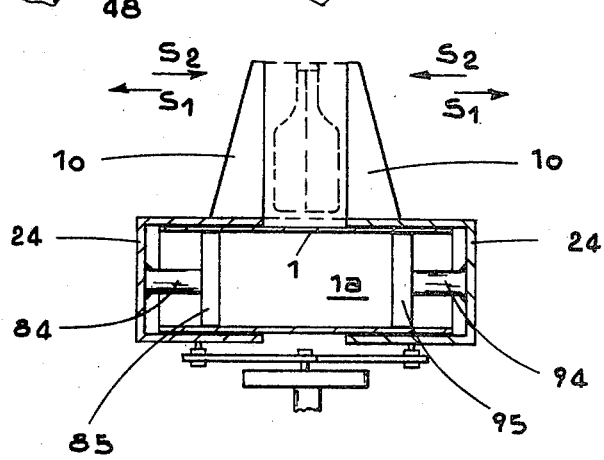
FIG. 4 is a diagrammatic representation of a second form of embodiment for the end wall operating means.

With reference to FIG. 4, it is obvious that the heads 24 are integral with corresponding rods 84 and 94 which, in turn, are integral with corresponding pistons 85 and 95. The said pistons slide inside the longitudinal through hole 1a in the tubular shaft 1. In other words, in addition to the functions to which prior reference has been made, the tubular shaft 1 is an integral part of the said operating means. The lines through which the oil sent to or coming from the hole 1a passes have not shown in FIG. 4 since they constitute an integral part of the prior art.

It can be seen from the foregoing that the apparatus according to the invention responds optimally to the objects preset herein.

Indeed the apparatus in question can diagramatically be considered to be constituted by two movable units supported by the shaft 1; the term "movable unit" being intended to imply everything that weighs down on a corresponding bush 9. The weights of the said movable units apply bending stress (of a static type) to the shaft 1, which is of limited value because of the restricted torque arm that exists between the line of action of the weight of each movable unit and because of the coupling of the sleeve 2 with the central part of the said shaft 1. As regards the static stress the said sleeve 2 transmits to the saddle 100, the said static stress (that is to say, the weights of the said movable units and the weight of the said shaft 1) apply prevalently compression stress to the saddle 100 on account of the said saddle being positioned immediately underneath the said sleeve 2.

Furthermore, the force of reaction to the force exerted by one end wall 10 on the other end wall 10 in order to achieve the optimum holding of the container in accordance with the profile in the said forming mold 12, results in the shaft 1 undergoing stress of the bending and twisting type, the first of which, namely the bending stress, being limited in value (obviously in comparison with similar thrusts generated on the permanent molds of apparatuses wherein the same functions, that is to say, the blow molding and conditioning of synthetic resin containers, are performed) in consequence of the fact that the torque arm between the line of action of the said force of reaction and the axis of the shaft 1 is somewhat restricted.

The elastic deformation as a consequence of the above mentioned static and dynamic stress is restricted in amplitude, and this is mainly because of the fact that the said stress is limited (naturally, again in comparison with similar apparatuses that carry out the same operations) and, secondly, because of the fact that the resistant cross section of the shaft 1 is tubular; this latter point is particularly favorable insofar as resistance to torsional stress is concerned. The fact too of an apparatus having been designed in which elastic deformation is of limited amplitude constitutes an especially positive factor as regards the compactness and the functional ability of the apparatus since limited deformation makes it possible, at the station K, for the axis of the mouth 12a and that of the tubular element 52, and at the station H, the axis of the mouth 12a and that of the nozzle 51, to be perfectly coaxial.

The downward directed force caused by the coupling of the nozzle 51 with the mouth 12a of the vacuum forming mold 12 causes, in practice, compression stress to be applied to the saddle 100.

One particularly favorable point in regard to the apparatus in question is the extremely simple way in which the bushes 9 are lubricated. In fact, when pressurized lubricating oil is let into the hole 16 via the aforementioned holes 17, a film of lubrication is formed between the shaft 1 and the bush 9.

Other points of notable importance to be emphasized in respect of the technical solution described herein relate to the extreme simplicity and, at the same time, originality of the means for operating the end walls 10 devised for the two forms of embodiment outlined herein, and to the particularly simple, yet highly functional, means destined to render synchronous the movements, in opposite directions, of the end walls 10.

It is understood that the foregoing description has been given purely as an unlimited example and thus that variants of a practical nature may be made to the constructional details, without this in any way constituting a limitation of the technical solution as described above and claimed hereunder.

What is claimed is:

1. Improved apparatus for blow molding and conditioning synthetic resin containers, of the type comprising: at least one extruder, fed with granules of a predetermined synthetic resin, from the extrusion head of which, that points downwards and defines an extrusion station, issues in an unbroken fashion a tubular element made of the said synthetic resin; two end walls, able to slide supported and guided by first support means, to which are locked in a removable fashion and in opposite position, corresponding permanent molds which, when in the closed position, jointly define a vacuum forming mold whose upper part is provided with a mouth that communicates with the outside and whose inside part contains the profile of a corresponding container; means for operating the said end walls, the actuation and deactuation of which constitute, for the aforementioned permanent molds, the said position of closure and an open position, respectively; means for synchronizing, in opposite directions, the translation of the said end walls; a saddle that carries the aforementioned support means and slides on rectilineal guides perpendicular to the translation direction of the said end walls, the inclination of the said guides being such as to decrease the elevation of the said end walls, starting at the said extrusion station; means for driving the said saddle between the said extrusion station and a blow molding station; means for shearing the said tubular element, the lower part of which is stably held under restraint in the vacuum forming mold at the time the said permanent molds are in the position of closure, in consequence of the translation of the said end walls from the extrusion station to the blow molding station; at least one nozzle, connected to a source of compressed air, movable vertically, positioned at the said blow molding station and destined to be hermetically inserted into the mouth of the said vacuum forming mold; gripping means, integral with the said end walls, destined to hook onto the container hanging on the said nozzle, to release the said container from the said nozzle, and to deposit the said container on a suitable conveyor; means for controlling the said operating means, destined to actuate and deactuate them compatibly with the positioning of the said end walls at the extrusion station and at the blow molding station, respectively, in the latter case at a time subsequent to the insertion of compressed air into the said vacuum forming mold; a tubular shaft that at least partially houses in the inside thereof the aforementioned operating means; a coupling sleeve fixed to the center of said shaft, said coupling sleeve being positional above and integral with said saddle; at least two bushes coupled to said shaft in a way whereby they are able to slide, said two bushes being positioned bilaterally to said coupling sleeve and each of said bushes being locked to one of two end walls; fixing means for locking said two bushes to said two end walls; means for locking one to the other, the coupling means and the said shaft, destined to prevent any rotation of the latter with respect to the axis thereof; and means for coupling one to the other in a sliding fashion and in the direction parallel to the axis of the said shaft, each end wall and the said saddle, destined to prevent any rotation of the said end wall with respect to the axis of the said shaft.

2. Apparatus according to claim 1, wherein the lower part of each end wall there is a through hole destined to receive, freely coupled therein, the corresponding bush, the said apparatus being characterized by the fact that the said second fixing means comprise, for each end wall: a flange, coupled to the said tubular shaft and freely inserted in a housing provided in the extremity of the through hole in the corresponding end wall turned towards the said coupling means, locked in a removable fashion to the said end wall and acting as the abutment shoulder for the corresponding extremity of the relevant bush; and a head for connecting one to the other the said operating means and the said end wall, positioned, with respect to the relevant bush, on the opposite side to the said flange and provided with a projecting part destined to come flush up against the corresponding extremity of the said bush.

3. Apparatus according to claim 2, wherein the said operating means are constituted by a double acting jack, positioned coaxially to the axis of the said shaft, the cylinder of which is locked to the connecting head of one of the end walls, while the rod thereof, lodged entirely in the through hole in the said shaft, is locked to the connecting head of the other end wall.

4. Apparatus according to claim 2, wherein the said operating means are constituted by a cylinder which, in practice is the said tubular shaft, and by a pair of pistons that slide hermetically in the said cylinder and are integral with their corresponding rods turned towards the extremities of the said tubular shaft and connected to the said connecting heads, respectively.

5. Apparatus according to claim 1, wherein the said synchronizing means comprise: a disk, rotatably constrained by the said saddle, so positioned as to have the axis thereof perpendicular to the translation direction of the said end walls; and at least two tie rods, each having one extremity pivoted to the corresponding end wall, and each having the other extremity pivoted, at an equidistant position and on the same diameter, to the said disk.

6. Apparatus according to claim 1, wherein the said means for coupling one to the other in a sliding fashion, in the direction parallel to the axis of the said shaft, each end wall and the said saddle, comprise, on the outside of each end wall, two fins, parallel to the translation direction of the end walls, destined to receive integrally between them, a plate having a vertical surface that mates with a corresponding vertical surface with which an arm carried by the said saddle is provided.

7. Apparatus according to claim 1, wherein the said means for coupling one to the other in a sliding fashion, in the direction parallel to the axis of the said shaft, each end wall and the said saddle, comprise: two projecting parts for each end wall, integral therewith, situated on opposite sides and extending parallel to the translation direction of the said end wall; two pads positioned beneath the said projecting parts, the underneath part thereof mating with the corresponding upper surface of a similar number of upright members integral with the saddle; means for locking, in a removable fashion, the pads to the corresponding projecting parts; and means for regulating the distance the underneath surface of the said projecting part is away from the facing surface of the corresponding pad.

8. Apparatus according to claim 1, wherein the said coupling means are constituted by a sleeve.

9. Apparatus according to claim 7, wherein strips of self lubricating material are placed integral with the said upper surface of the upright members.

* * * * *